United States Patent
Liu et al.

(10) Patent No.: US 10,389,499 B2
(45) Date of Patent: Aug. 20, 2019

(54) METHOD AND APPARATUS FOR BIT NUMBER ALLOCATION AND POWER ALLOCATION OF SUBCARRIERS AND ELECTRONIC EQUIPMENT

(71) Applicant: Fujitsu Limited, Kawasaki-shi, Kanagawa (JP)

(72) Inventors: Bo Liu, Beijing (CN); Lei Li, Beijing (CN)

(73) Assignee: FUJITSU LIMITED, Kawasaki (JP)

(*) Notice: Subject to any disclaimer, the term of this patent is extended or adjusted under 35 U.S.C. 154(b) by 26 days.

(21) Appl. No.: 15/720,471

(22) Filed: Sep. 29, 2017

(65) Prior Publication Data
US 2018/0145806 A1    May 24, 2018

(30) Foreign Application Priority Data
Nov. 24, 2016   (CN) .......................... 2016 1 1049997

(51) Int. Cl.
*H04L 5/00* (2006.01)
*H04W 36/14* (2009.01)
(Continued)

(52) U.S. Cl.
CPC .......... *H04L 5/0046* (2013.01); *H04L 5/006* (2013.01); *H04W 36/14* (2013.01); *H04W 36/30* (2013.01);
(Continued)

(58) Field of Classification Search
None
See application file for complete search history.

(56) References Cited

U.S. PATENT DOCUMENTS 8,902,808 B2 * 12/2014 Dahrouj ............... H04W 52/241
                                                    370/318
2001/0031014 A1 * 10/2001 Subramanian ...... H04L 27/2608
                                                    375/260
(Continued)

FOREIGN PATENT DOCUMENTS

CN       1787426      6/2006
CN       103607368    2/2014

OTHER PUBLICATIONS

Zhang Dong-mei ect."High efficiency algorithm of power and bit allocation for OFDMA system", Journal on Communications, 2008, 6 pages.
(Continued)

*Primary Examiner* — Chi H Pham
*Assistant Examiner* — Vladislav Y Agureyev
(74) *Attorney, Agent, or Firm* — Staas & Halsey LLP

(57) ABSTRACT

An apparatus and method for bit number allocation and power allocation of subcarriers and electronic equipment. The apparatus includes: a bit number calculating unit configured to calculate bit numbers to which subcarriers in a multicarrier communications system correspond according to signal to noise ratios of the subcarriers; a bit number allocating unit configured to allocate bit numbers for the subcarriers based on the bit numbers to which the subcarriers correspond calculated by the bit number calculating unit and a phase noise of the multicarrier communications system in communicating; wherein, the allocated bit numbers are related to signal modulation formats of the subcarriers; and a power allocating unit configured to allocate corresponding power for the subcarriers according to the bit numbers allocated by the bit number allocating unit for the subcarriers. With the embodiments, a transmission perfor-
(Continued)

mance of the multicarrier communications system may be improved.

12 Claims, 6 Drawing Sheets

(51) Int. Cl.
    *H04W 36/30* (2009.01)
    *H04W 52/34* (2009.01)
    *H04L 27/26* (2006.01)
    *H04W 52/24* (2009.01)
    *H04W 52/26* (2009.01)

(52) U.S. Cl.
    CPC ....... *H04W 52/346* (2013.01); *H04L 27/2626* (2013.01); *H04W 52/24* (2013.01); *H04W 52/241* (2013.01); *H04W 52/267* (2013.01)

(56) References Cited

U.S. PATENT DOCUMENTS

| | | | | |
|---|---|---|---|---|
| 2002/0154688 | A1* | 10/2002 | Pollmann | H04L 1/0003 375/229 |
| 2003/0185147 | A1* | 10/2003 | Taga | H04L 27/2647 370/210 |
| 2004/0081248 | A1* | 4/2004 | Parolari | H04L 1/0003 375/259 |
| 2005/0169357 | A1* | 8/2005 | Sedarat | H04L 27/2657 375/222 |
| 2006/0120445 | A1 | 6/2006 | Okamura | |
| 2009/0316766 | A1* | 12/2009 | Korobkov | H04B 3/54 375/227 |
| 2009/0316842 | A1* | 12/2009 | Lu | H04L 1/20 375/346 |
| 2011/0075745 | A1* | 3/2011 | Kleider | H04L 25/03057 375/260 |
| 2011/0293031 | A1 | 12/2011 | Zhang et al. | |
| 2013/0126713 | A1* | 5/2013 | Haas | H04B 10/116 250/208.2 |
| 2014/0018123 | A1* | 1/2014 | Frank | H04W 52/367 455/522 |
| 2014/0023155 | A1* | 1/2014 | Khoryaev | H04L 25/08 375/260 |
| 2016/0204871 | A1* | 7/2016 | Li | H04L 27/2601 398/183 |
| 2016/0323039 | A1* | 11/2016 | Sun | H04B 10/5161 |
| 2018/0097593 | A1* | 4/2018 | Da Silva | H04L 5/0048 |

OTHER PUBLICATIONS

Ding Xiao-yong ect. "Allocation algorithm of sub-carrier, bit and power for low-complexity OFDMA system", Applied Science and Technology, 2007, 5 pages.

* cited by examiner

METHOD AND APPARATUS FOR BIT NUMBER ALLOCATION AND POWER ALLOCATION OF SUBCARRIERS AND ELECTRONIC EQUIPMENT

CROSS-REFERENCE TO RELATED APPLICATIONS

This application claims the benefit of Chinese Application No. 201611049997.5, filed Nov. 24, 2016, in the Chinese Intellectual Property Office, the disclosure of which is incorporated herein by reference.

BACKGROUND

1. Field

This disclosure relates to the field of communications technologies, and in particular to a method and apparatus for bit number allocation and power allocation of subcarriers and electronic equipment.

2. Description of the Related Art

A multicarrier communications system is a high-efficiency optical communications system, represented by a discrete multi-tone (DMT) system. In the multicarrier communications system, it is often needed to segment a channel into multiple subcarriers for performing signal transmission.

In the multicarrier communications system, different bit numbers may be allocated for the subcarriers according to signal to noise ratios (SNRs) of the subcarriers, the bit numbers determining modulation formats of the subcarriers. And according to the modulation formats of the subcarriers, power may be allocated for the subcarriers.

It should be noted that the above description of the background is merely provided for clear and complete explanation of this disclosure and for easy understanding by those skilled in the art. And it should not be understood that the above technical solution is known to those skilled in the art as it is described in the background of this disclosure.

SUMMARY

Additional aspects and/or advantages will be set forth in part in the description which follows and, in part, will be apparent from the description, or may be learned by practice of the embodiments.

It was found by the inventors of this application that in the related art, influence of phase noises in the multicarrier communications system is not taken into account in allocating bit numbers and power for the subcarriers, hence, transmission performance of the multicarrier communications system is degraded.

Embodiments of this application provide a method and apparatus for bit number allocation and power allocation of subcarriers and electronic equipment, in which bit number are allocated for subcarriers according to phase noises in a multicarrier communications system, so as to improve transmission performance of the multicarrier communications system.

According to a first aspect of the embodiments of this disclosure, there is provided an apparatus for bit number allocation and power allocation of subcarriers, including:

a bit number calculating unit configured to calculate bit numbers to which subcarriers in a multicarrier communications system correspond according to signal to noise ratios of the subcarriers;

a bit number allocating unit configured to allocate bit numbers for the subcarriers based on the bit numbers to which the subcarriers correspond calculated by the bit number calculating unit and a phase noise of the multicarrier communications system in communicating; the allocated bit numbers are related to signal modulation formats of the subcarriers; and a power allocating unit configured to allocate corresponding power for the subcarriers according to the bit numbers allocated by the bit number allocating unit for the subcarriers.

According to a second aspect of the embodiments of this disclosure, there is provided a method for bit number allocation and power allocation of subcarriers, including:

calculating bit numbers to which subcarriers in a multicarrier communications system correspond according to signal to noise ratios of the subcarriers;

allocating bit numbers for the subcarriers based on the bit numbers to which the calculated subcarriers correspond and a phase noise of the multicarrier communications system in communicating; the allocated bit numbers are related to signal modulation formats of the subcarriers; and allocating corresponding power for the subcarriers according to the allocated bit numbers for the subcarriers.

According to a third aspect of the embodiments of this disclosure, there is provided electronic equipment, including the apparatus for bit number allocation and power allocation of subcarriers as described in the first aspect.

An advantage of the embodiments of this disclosure exists in that a transmission performance of the multicarrier communications system may be improved.

With reference to the following description and drawings, the particular embodiments of this disclosure are disclosed in detail, and the principle of this disclosure and the manners of use are indicated. It should be understood that the scope of the embodiments of this disclosure is not limited thereto. The embodiments of this disclosure contain many alternations, modifications and equivalents within the scope of the terms of the appended claims.

Features that are described and/or illustrated with respect to one embodiment may be used in the same way or in a similar way in one or more other embodiments and/or in combination with or instead of the features of the other embodiments.

It should be emphasized that the term "comprises/comprising/includes/including" when used in this specification is taken to specify the presence of stated features, integers, steps or components but does not preclude the presence or addition of one or more other features, integers, steps, components or groups thereof.

BRIEF DESCRIPTION OF THE DRAWINGS

The drawings are included to provide further understanding of the present disclosure, which constitute a part of the specification and illustrate the preferred embodiments of the present disclosure, and are used for setting forth the principles of the present disclosure together with the description. It is obvious that the accompanying drawings in the following description are some embodiments of this disclosure, and for those of ordinary skills in the art, other accompanying drawings may be obtained according to these accompanying drawings without making an inventive effort. In the drawings.

DETAILED DESCRIPTION

These and further aspects and features of the present disclosure will be apparent with reference to the following description and attached drawings. In the description and drawings, particular embodiments of the disclosure have been disclosed in detail as being indicative of some of the ways in which the principles of the disclosure may be employed, but it is understood that the disclosure is not limited correspondingly in scope. Rather, the disclosure includes all changes, modifications and equivalents coming within the terms of the appended claims.

Embodiment 1

Embodiment 1 of this application provides an apparatus for bit number allocation and power allocation of subcarriers, used for performing bit number allocation and power allocation for subcarriers used by a multicarrier communications system.

Figure 1:
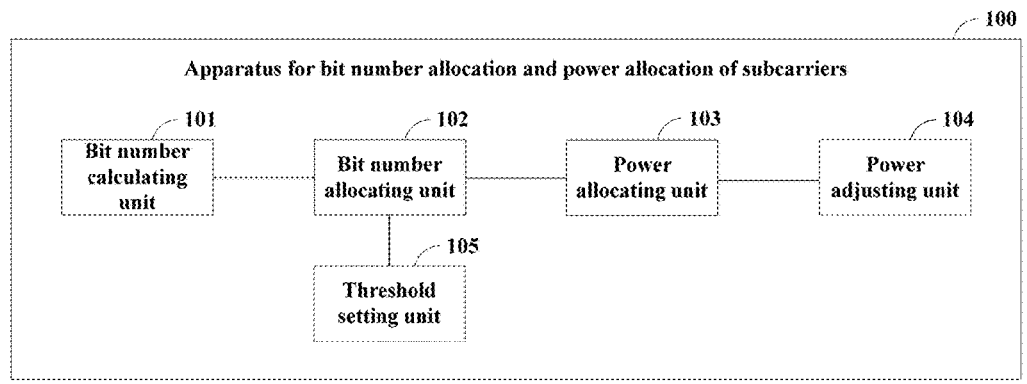
FIG. 1 is a schematic diagram of the apparatus for bit number allocation and power allocation of subcarriers of Embodiment 1 of this application.

FIG. 1 is a schematic diagram of the apparatus for bit number allocation and power allocation of subcarriers of Embodiment 1 of this application. As shown in FIG. 1, the apparatus 100 includes a bit number calculating unit 101, a bit number allocating unit 102 and a power allocating unit 103.

In this embodiment, the bit number calculating unit 101 calculates bit numbers to which subcarriers in a multicarrier communications system correspond according to signal to noise ratios of the subcarriers, the bit number allocating unit 102 allocates bit numbers for the subcarriers based on the bit numbers to which the subcarriers correspond calculated by the bit number calculating unit 101 and a phase noise of the multicarrier communications system in communicating; and, the allocated bit numbers are related to signal modulation formats of the subcarriers, and the power allocating unit 103 allocates corresponding power for the subcarriers according to the bit numbers allocated by the bit number allocating unit 102 for the subcarriers.

With the embodiment of this application, the bit numbers may be allocated for the subcarriers based on the phase noise in the multicarrier communications system, thereby improving a transmission performance of the multicarrier communications system.

In this embodiment, the bit number calculating unit 101 may calculate the bit numbers to which the subcarriers correspond for the subcarriers according to the SNRs of the subcarriers, and the bit numbers calculated by bit number calculating unit 101 are often not integers. The related art may be referred to for calculating the bit numbers by bit number calculating unit 101, which shall not be described herein any further.

Figure 2:
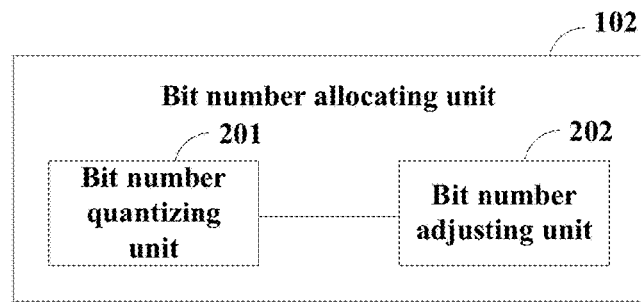
FIG. 2 is a schematic diagram of a bit number allocating unit of Embodiment 1 of this application.

FIG. 2 is a schematic diagram of the bit number allocating unit of this embodiment. As shown in FIG. 2, the bit number allocating unit 102 may include a bit number quantizing unit 201 and a bit number adjusting unit 202.

In this embodiment, the bit number quantizing unit 201 is configured to quantize the bit numbers of the subcarriers calculated by the bit number allocating unit 101, so as to obtain integer bit numbers, and the bit number adjusting unit 202 is configured to adjust the integer bit numbers according to a result of comparison of the integer bit numbers with predetermined thresholds set based on a phase noise, and take the adjusted bit numbers as the bit numbers allocated by the bit number allocating unit 102.

In this embodiment, the bit numbers calculated by bit number calculating unit 101 may be called a first bit number, and the integer bit number obtained by the bit number quantizing unit 201 may be called a second bit number. The first bit number may not be integer, while the second bit number is integer.

In this embodiment, the related art may be referred to for performing quantization by the bit number quantizing unit 201, which shall not be described herein any further.

In this embodiment, the bit number adjusting unit 202 may adjust the integer bit numbers according to the result of comparison of the integer bit numbers with the predetermined thresholds. For example, when the integer bit numbers are greater than the predetermined thresholds, the bit number adjusting unit 202 may adjust the integer bit numbers into predetermined bit numbers less than or equal to the predetermined thresholds, and when the integer bit numbers are less than or equal to the predetermined thresholds, the bit number adjusting unit 202 may set the adjusted integer bit numbers to be equal to the integer bit numbers. Of course, the manner of adjusting by the bit number adjusting unit 202 is not limited thereto.

In this embodiment, the power allocating unit 103 may allocate corresponding power for the subcarriers according to the bit numbers allocated by the bit number allocating unit 102 for the subcarriers. The related art may be referred to for a particular method for allocating power by the power allocating unit 103, which shall not be described herein any further.

In this embodiment, as the phase noise of the multicarrier communications system may cause constellations to which the subcarriers correspond to rotate with respect to origins of the constellations, a farthest distance between constellation points of the constellations to which the subcarriers correspond and centers may be lowered by adjusting bit numbers of the subcarriers. Hence, in a case where the constellations are rotated, relatively large offset of distribution of signals around the constellation points may be avoided, thereby improving the transmission performance of the multicarrier communications system.

In this embodiment, as shown in FIG. 1, the apparatus 100 may further include a power adjusting unit 104 configured to adjust the power allocated by the power allocating unit 103 for the subcarriers according to the phase noise.

Figure 3:
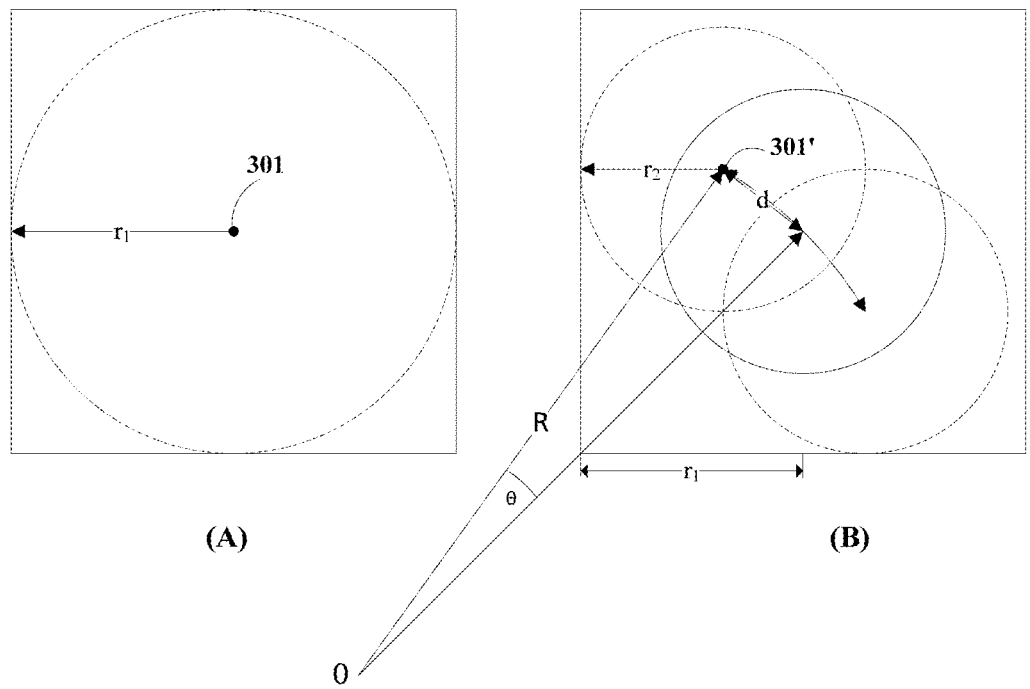
FIG. 3 is a schematic diagram of distribution of signals around constellation points before and after being adjusted by a power adjusting unit of Embodiment 1 of this application.

FIG. 3 is a schematic diagram of the distribution of signals around the constellation points before and after being adjusted by the power adjusting unit 104. As shown in FIG. 3, (A) denotes distribution of signals around the constellation points before adjustment, and a range of distribution of signals is: a circle taking a constellation point 301 as the center and $r_1$ as the radius; and (B) denotes distribution of signals around the constellation points after adjustment, and a range of distribution of signals is: a circle taking a constellation point 301' as the center and $r_2$ as the radius.

As shown in FIG. 3, $r_2$ is less than $r_1$, hence, even though the constellations are rotated due to the phase noise, the distribution of signals around the constellation points after rotation does not go beyond the range of the original circle taking a constellation point 301 as the center and $r_1$ as the radius. Hence, relatively large offset of distribution of signals around the constellation points may be avoided, thereby improving the transmission performance of the multicarrier communications system.

In this embodiment, as the power allocated for the subcarriers is inversely proportional to a magnitude of a radius, power of the subcarriers to which the adjusted constellation points correspond shown in FIG. 3 is greater than that before adjustment, that is, by enlarging the power allocated for the subcarriers, the transmission performance of the multicarrier communications system may be improved.

For example, a ratio of the power after adjustment and the power before adjustment may be expressed by formula (1) below:

$$\frac{r_1}{r_1 - \frac{\sqrt{2}}{2} R \sin\theta} \quad (1)$$

where, θ denotes a rotation angle of the constellation of the subcarriers induced by the phase noise, and R denotes the farthest distance from the constellation points in the constellation to which the subcarriers correspond to the center.

In this embodiment, the ratio of the power after adjustment and the power before adjustment may also be expressed by other formulae, and this embodiment is not limited to formula (1).

In this embodiment, as shown in FIG. 1, the apparatus 100 may further include a threshold setting unit 105, which is able to set the predetermined thresholds used by the bit number adjusting unit 202 according to the phase noise.

Figure 4:
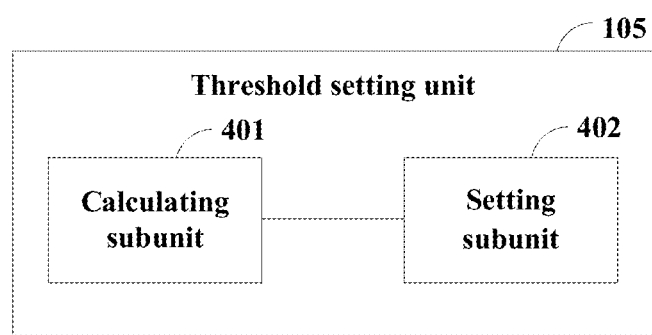
FIG. 4 is a schematic diagram of a threshold setting unit of Embodiment 1 of this application.

FIG. 4 is a schematic diagram of the threshold setting unit 105 of this embodiment. As shown in FIG. 4, the threshold setting unit 105 includes a calculating subunit 401 and a setting subunit 402.

In this embodiment, according to a rotation angle of a constellation induced by the phase noise and maximum predetermined distances constellation points are permitted to move in the constellation to which the subcarriers correspond, the calculating subunit 401 may calculate a farthest distance from the constellation points in the constellation to a center, and the setting subunit 402 may set the modulation formats according to a correspondence relationship between a farthest distance and a modulation format and the farthest distance, and take bit numbers to which the set modulation formats correspond as the predetermined thresholds.

In this embodiment, the calculating subunit 401 may calculate the farthest distance R from the constellation points in the current constellation to a center O according to formula (2) below:

$$R = d/\sin(\theta) \quad (2).$$

(B) in FIG. 3 may be referred to for meanings of the signs in formula (2); where, θ denotes the rotation angle of the constellation of the subcarriers induced by the phase noise, R denotes the farthest distance from the constellation points in the constellation to which the subcarriers correspond to the center O, and d denotes the maximum predetermined distances constellation points are permitted to move in the constellation to which the subcarriers correspond.

In this embodiment, the setting subunit 402 may acquire the farthest distance from the constellation points in the constellation to the center O from a pre-stored list, judge a modulation format to which the farthest distance corresponds calculated by the calculating subunit 401, and take the bit number to which the modulation format corresponds as the predetermined threshold.

Furthermore, in this embodiment, the apparatus 100 may not include the threshold setting unit 104, but may include a storage portion (not shown), which may store a predetermined list of correspondence between phase noises and predetermined thresholds. Hence, the predetermined thresholds may be directly read from the storage portion.

With the embodiment of this application, bit numbers may be allocated for the subcarriers based on the phase noise in the multicarrier communications system, thereby improving the transmission performance of the multicarrier communications system. And furthermore, power may be allocated for the subcarriers based on the phase noise in the multicarrier communications system, thereby further improving the transmission performance of the multicarrier communications system.

Figure 5A:
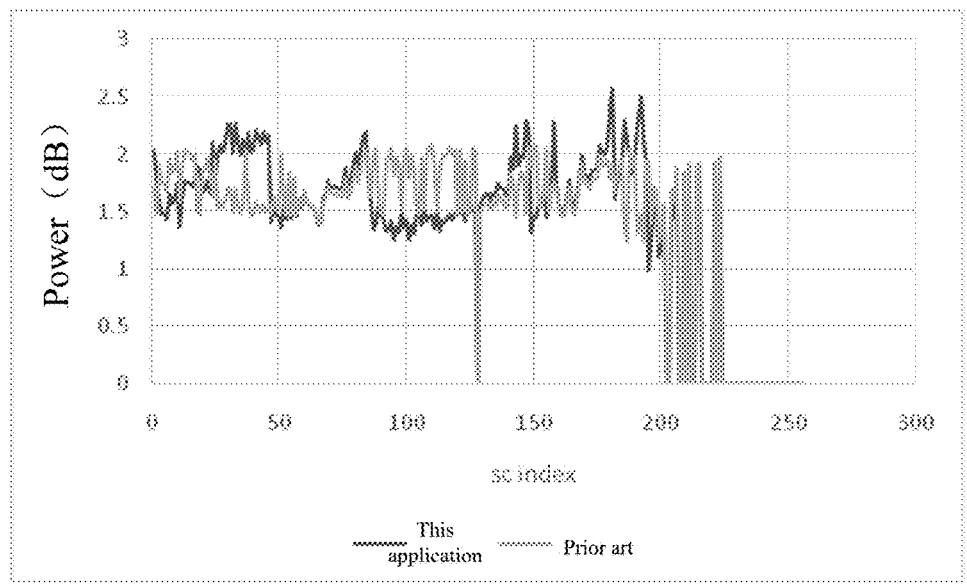
FIG. 5A-5C is a schematic diagram of effects of bit allocation and power allocation performed by a multicarrier communications system by respectively using the apparatus of Embodiment 1 of this application and an apparatus in the related art.
Figure 5B:
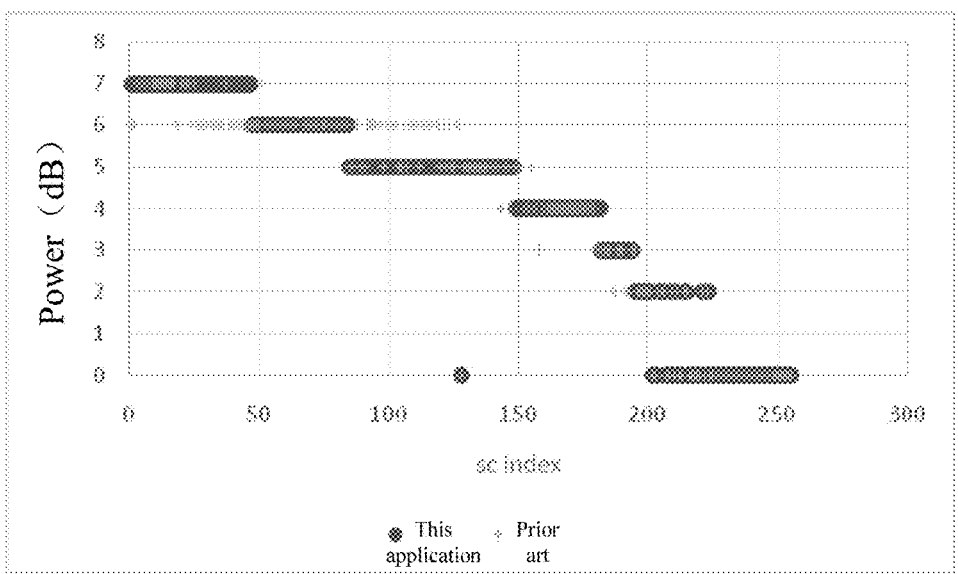
Figure 5C:
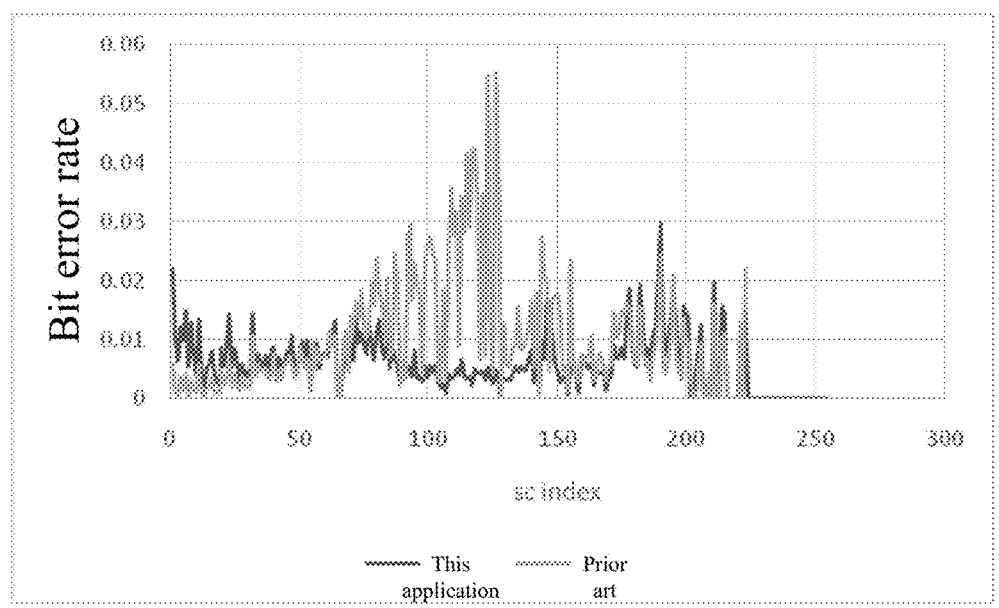

FIG. 5 gives a schematic diagram of effects of bit allocation and power allocation performed by the multicarrier communications system by respectively using the apparatus of this embodiment and an apparatus in the related art. (A), (B) and (C) in FIG. 5 are respective schematic diagrams of power allocation, bit number allocation and bit error rates (BERs), of the subcarriers, in which horizontal axes are indices of the subcarriers, and vertical axes are the power, bit numbers and BERs, respectively. As shown in (A) and (B) in FIG. 5, at subcarriers 80-130, the apparatus of this embodiment allocates higher power and less bit numbers; and as shown in (C) in FIG. 5, the apparatus of this embodiment may outstandingly lower the BERs of the subcarriers.

Embodiment 2

Embodiment 2 of this application provides a method for bit number allocation and power allocation of subcarriers, corresponding to the apparatus 100 in Embodiment 1.

Figure 6:
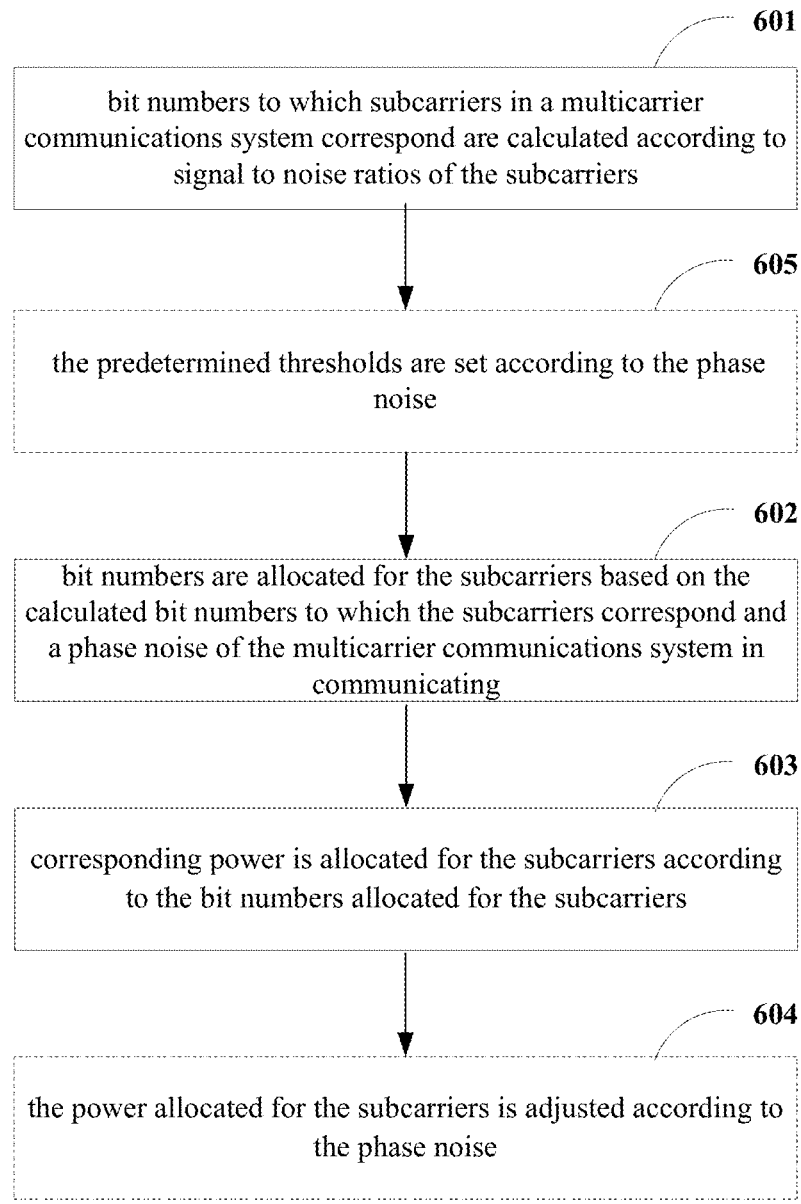
FIG. 6 is a flowchart of the method for bit number allocation and power allocation of subcarriers of Embodiment 2 of this application.

FIG. 6 is a flowchart of the method of this embodiment. As shown in FIG. 6, the method includes:

step 601: bit numbers to which subcarriers in a multicarrier communications system correspond are calculated according to signal to noise ratios of the subcarriers;

step 602: bit numbers are allocated for the subcarriers based on the calculated bit numbers to which the subcarriers correspond and a phase noise of the multicarrier communications system in communicating; the allocated bit numbers are related to signal modulation formats of the subcarriers; and step 603: corresponding power is allocated for the subcarriers according to the bit numbers allocated for the subcarriers.

As shown in FIG. 6, the method may further include:

step 604: the power allocated for the subcarriers is adjusted according to the phase noise.

In step 604, a ratio of the power after adjustment and the power before adjustment may be expressed by formula (1) above.

As shown in FIG. 6, the method may further include:

step 605: the predetermined thresholds are set according to the phase noise.

Figure 7:
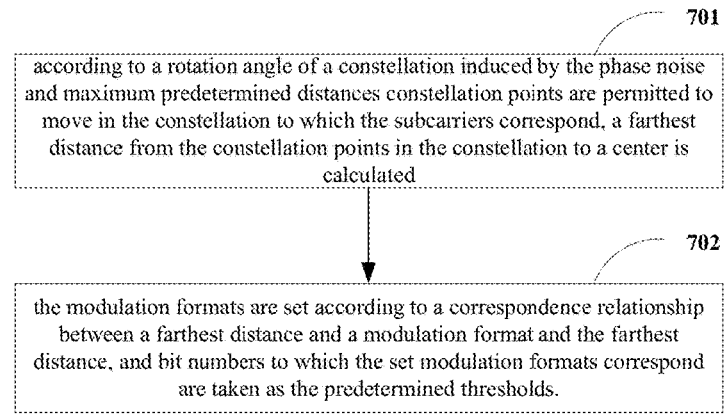
FIG. 7 is a flowchart of a method for setting predetermined thresholds of Embodiment 2 of this application.

FIG. 7 is a flowchart of a method for setting the predetermined thresholds of this embodiment. As shown in FIG. 7, the method for setting the predetermined thresholds includes:

step 701: according to a rotation angle of a constellation induced by the phase noise and maximum predetermined distances constellation points are permitted to move in the constellation to which the subcarriers correspond, a farthest distance from the constellation points in the constellation to a center is calculated; and step 702: the modulation formats are set according to a correspondence relationship between a farthest distance and a modulation format and the farthest distance, and bit numbers to which the set modulation formats correspond are taken as the predetermined thresholds.

With the embodiment of this application, bit numbers may be allocated for the subcarriers based on the phase noise in the multicarrier communications system, thereby improving the transmission performance of the multicarrier communications system. And furthermore, power may be allocated for the subcarriers based on the phase noise in the multicarrier communications system, thereby further improving the transmission performance of the multicarrier communications system.

Embodiment 3

Embodiment 3 of this application provides electronic equipment, including the apparatus for bit number allocation and power allocation of subcarriers described in Embodiment 1.

Figure 8:
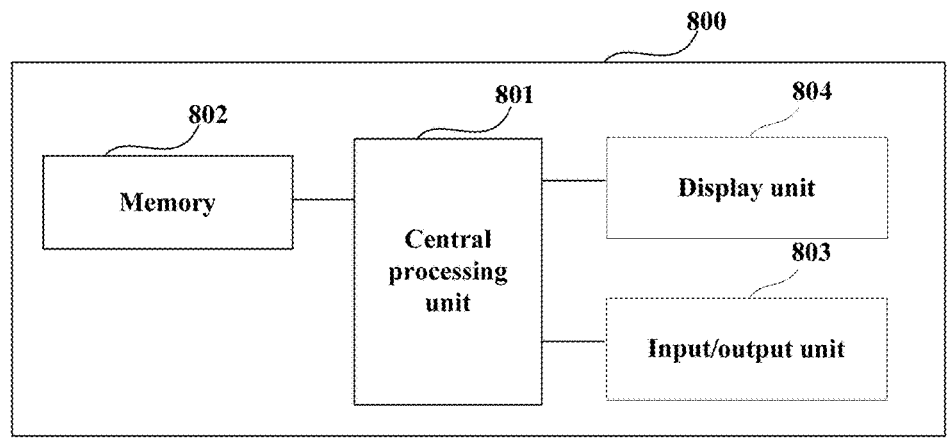
FIG. 8 is a schematic diagram of the electronic equipment of Embodiment 3 of this application.

FIG. 8 is a schematic diagram of the electronic equipment of Embodiment 3 of this application. As shown in FIG. 8, the electronic equipment 800 may include a central processing unit (CPU) 801 and a memory 802, the memory 802 being coupled to the central processing unit 801. For example, the memory 802 may store various data, and furthermore, it may store a program for performing bit number allocation and power allocation, and execute the program under control of the central processing unit 801.

In an implementation, the functions of the apparatus for bit number allocation and power allocation of subcarriers may be integrated into the central processing unit 801.

The central processing unit 801 may be configured to:

calculate bit numbers to which subcarriers in a multicarrier communications system correspond according to signal to noise ratios of the subcarriers;

allocate bit numbers for the subcarriers based on the calculated bit numbers to which the subcarriers correspond and a phase noise of the multicarrier communications system in communicating; wherein, the allocated bit numbers are related to signal modulation formats of the subcarriers; and allocate corresponding power for the subcarriers according to the bit numbers allocated for the subcarriers.

The central processing unit 801 may further be configured to:

quantize the calculated bit numbers of the subcarriers, so as to obtain integer bit numbers; and adjust the integer bit numbers according to a result of comparison of the integer bit numbers with predetermined thresholds set based on a phase noise, and take the adjusted bit numbers as the allocated bit numbers.

The central processing unit 801 may further be configured to:

set the predetermined thresholds according to the phase noise.

The central processing unit 801 may further be configured to:

according to a rotation angle of a constellation induced by the phase noise and maximum predetermined distances constellation points are permitted to move in the constellation to which the subcarriers correspond, calculate a farthest distance from the constellation points in the constellation to a center; and set the modulation formats according to a correspondence relationship between a farthest distance and a modulation format and the farthest distance, and take bit numbers to which the set modulation formats correspond as the predetermined thresholds.

The central processing unit 801 may further be configured to:

adjust the power allocated by the power allocating unit for the subcarriers according to the phase noise.

The central processing unit 801 may further be configured to:

a ratio of power after adjustment and power before adjustment is:

$$\frac{r_1}{r_1 - \frac{\sqrt{2}}{2} R \sin\theta};$$

where, $\theta$ denotes the rotation angle of the constellation of the subcarriers induced by the phase noise, R denotes the farthest distance from the constellation points in the constellation to which the subcarriers correspond to the center, and $r_1$ denotes a distribution radius of signals around the constellation points in the constellation before adjustment.

Furthermore, as shown in FIG. 8, the electronic equipment 800 may include an input/output unit 803, and a display unit 804, etc. Functions of the above components are similar to those in the related art, and shall not be described herein any further. It should be noted that the electronic equipment 800 does not necessarily include all the parts shown in FIG. 8, and furthermore, the electronic equipment 800 may include parts not shown in FIG. 8, and the related art may be referred to.

An embodiment of the present disclosure further provides a computer readable program code, which, when executed in an apparatus for bit number allocation and power allocation of subcarriers or electronic equipment, will cause the apparatus or the electronic equipment to carry out the method for bit number allocation and power allocation of subcarriers described in Embodiment 2.

An embodiment of the present disclosure provides a computer readable medium, including a computer readable program code, which will cause an apparatus for bit number allocation and power allocation of subcarriers or electronic equipment to carry out the method for bit number allocation and power allocation of subcarriers described in Embodiment 2.

The apparatus for bit number allocation and power allocation of subcarriers described with reference to the embodiments of this disclosure may be directly embodied as hardware, software modules executed by a processor, or a combination thereof. For example, one or more functional block diagrams and/or one or more combinations of the functional block diagrams shown in FIGS. 1-2 may either correspond to software modules of procedures of a computer program, or correspond to hardware modules. Such software modules may respectively correspond to the steps described in Embodiment 2. And the hardware module, for example, may be carried out by firming the soft modules by using a field programmable gate array (FPGA).

The soft modules may be located in an RAM, a flash memory, an ROM, an EPROM, and EEPROM, a register, a hard disc, a floppy disc, a CD-ROM, or any non-transitory computer readable storage or memory medium in other forms known in the art. A memory medium may be coupled to a processor, so that the processor may be able to read information from the memory medium, and write information into the memory medium; or the memory medium may be a component of the processor. The processor and the memory medium may be located in an ASIC. The soft modules may be stored in a memory of a mobile terminal, and may also be stored in a memory card of a pluggable mobile terminal. For example, if equipment (such as a mobile terminal) employs an MEGA-SIM card of a relatively large capacity or a flash memory device of a large capacity, the soft modules may be stored in the MEGA-SIM card or the flash memory device of a large capacity.

One or more functional blocks and/or one or more combinations of the functional blocks in FIGS. 1-2 may be realized as a universal processor, a digital signal processor (DSP), an application-specific integrated circuit (ASIC), a field programmable gate array (FPGA) or other programmable logic devices, discrete gate or transistor logic devices, discrete hardware component or any appropriate combinations thereof carrying out the functions described in this application. And the one or more functional block diagrams and/or one or more combinations of the functional block diagrams shown in FIGS. 1-2 may also be realized as a combination of computing equipment, such as a combination of a DSP and a microprocessor, multiple processors, one or more microprocessors in communications combination with a DSP, or any other such configuration.

This disclosure is described above with reference to particular embodiments. However, it should be understood by those skilled in the art that such a description is illustrative only, and not intended to limit the protection scope of the present disclosure. Various variants and modifications may be made by those skilled in the art according to the principle of the present disclosure, and such variants and modifications fall within the scope of the present disclosure.

For implementations of the present disclosure containing the above embodiments, following supplements are further disclosed.

Supplement 1. An apparatus for bit number allocation and power allocation of subcarriers, including:

a bit number calculating unit configured to calculate bit numbers to which subcarriers in a multicarrier communications system correspond according to signal to noise ratios of the subcarriers;

a bit number allocating unit configured to allocate bit numbers for the subcarriers based on the bit numbers to which the subcarriers correspond calculated by the bit number calculating unit and a phase noise of the multicarrier communications system in communicating; wherein, the allocated bit numbers are related to signal modulation formats of the subcarriers; and a power allocating unit configured to allocate corresponding power for the subcarriers according to the bit numbers allocated by the bit number allocating unit for the subcarriers.

Supplement 2. The apparatus according to supplement 1, wherein the bit number allocating unit includes:

a bit number quantizing unit configured to quantize the bit numbers of the subcarriers calculated by the bit number allocating unit, so as to obtain integer bit numbers; and a bit number adjusting unit configured to adjust the integer bit numbers according to a result of comparison of the integer bit numbers with predetermined thresholds set based on a phase noise, and take the adjusted bit numbers as the bit numbers allocated by the bit number allocating unit.

Supplement 3. The apparatus according to supplement 2, wherein the apparatus further includes:

a threshold setting unit configured to set the predetermined thresholds according to the phase noise.

Supplement 4. The apparatus according to supplement 3, wherein the threshold setting unit includes:

a calculating subunit configured to, according to a rotation angle of a constellation induced by the phase noise and maximum predetermined distances that constellation points are permitted to move in the constellation to which the subcarriers correspond, calculate a farthest distance from the constellation points in the constellation to a center; and a setting subunit configured to set the modulation formats according to a correspondence relationship between a farthest distance and a modulation format and the farthest distance, and take bit numbers to which the set modulation formats correspond as the predetermined thresholds.

Supplement 5. The apparatus according to supplement 1, wherein the apparatus further includes:

a power adjusting unit configured to adjust the power allocated by the power allocating unit for the subcarriers according to the phase noise.

Supplement 6. The apparatus according to supplement 5, wherein, a ratio of power after adjustment and power before adjustment is:

$$\frac{r_1}{r_1 - \frac{\sqrt{2}}{2} R \sin\theta};$$

where, $\theta$ denotes the rotation angle of the constellation of the subcarriers induced by the phase noise;

R denotes the farthest distance from the constellation points in the constellation to which the subcarriers correspond to the center;

and $r_1$ denotes a distribution radius of signals around the constellation points in the constellation before adjustment.

Supplement 7. Electronic equipment, including the apparatus for bit number allocation and power allocation of subcarriers as described in any one of supplements 1-6.

Supplement 8. A method for bit number allocation and power allocation of subcarriers, including:

calculating bit numbers to which subcarriers in a multicarrier communications system correspond according to signal to noise ratios of the subcarriers;

allocating bit numbers for the subcarriers based on the calculated bit numbers to which the subcarriers correspond and a phase noise of the multicarrier communications system in communicating; wherein, the allocated bit numbers are related to signal modulation formats of the subcarriers; and allocating corresponding power for the subcarriers according to the bit numbers allocated for the subcarriers.

Supplement 9. The method according to supplement 8, wherein the allocating bit numbers for the subcarriers includes:

quantizing the calculated bit numbers of the subcarriers, so as to obtain integer bit numbers; and adjusting the bit numbers according to a result of comparison of the integer bit numbers with predetermined thresholds set based on a phase noise, and taking the adjusted bit numbers as the allocated bit numbers.

Supplement 10. The method according to supplement 8, wherein the method further includes:

setting the predetermined thresholds according to the phase noise.

Supplement 11. The method according to supplement 10, wherein the setting the predetermined thresholds includes:

according to a rotation angle of a constellation induced by the phase noise and maximum predetermined distances that constellation points are permitted to move in the constellation to which the subcarriers correspond, calculating a farthest distance from the constellation points in the constellation to a center; and setting the modulation formats according to a correspondence relationship between a farthest distance and a modulation format and the farthest distance, and taking bit numbers to which the set modulation formats correspond as the predetermined thresholds.

Supplement 12. The method according to supplement 8, wherein the method further includes:

adjusting the power allocated for the subcarriers according to the phase noise.

Supplement 13. The method according to supplement 12, wherein, a ratio of power after adjustment and power before adjustment is:

$$\frac{r_1}{r_1 - \frac{\sqrt{2}}{2} R \sin\theta};$$

where, $\theta$ denotes the rotation angle of the constellation of the subcarriers induced by the phase noise;

R denotes the farthest distance from the constellation points in the constellation to which the subcarriers correspond to the center;

and $r_1$ denotes a distribution radius of signals around the constellation points in the constellation before adjustment.

Although a few embodiments have been shown and described, it would be appreciated by those skilled in the art that changes may be made in these embodiments without departing from the principles and spirit thereof, the scope of which is defined in the claims and their equivalents.

What is claimed is:

1. An apparatus for bit number allocation and power allocation of subcarriers, including:

a bit number calculating unit configured to calculate carrier bit numbers to which the subcarriers in a multicarrier communications system correspond according to signal to noise ratios of the subcarriers;

a bit number allocating unit configured to allocate the carrier bit numbers for the subcarriers based on the carrier bit numbers to which the subcarriers correspond calculated by the bit number calculating unit and a phase noise of the multicarrier communications system in communicating, where allocated bit numbers are related to signal modulation formats of the subcarriers, the bit number allocating unit including a bit number quantizing unit configured to quantize the carrier bit numbers of the subcarriers calculated by the bit number allocating unit to obtain integer bit numbers, and a bit number adjusting unit configured to adjust the integer bit numbers according to a result of a comparison of the integer bit numbers with predetermined thresholds set based on a phase noise, and use adjusted bit numbers as the carrier bit numbers allocated by the bit number allocating unit; and a power allocating unit configured to allocate corresponding power for the subcarriers according to the allocated bit numbers allocated by the bit number allocating unit for the subcarriers.

2. The apparatus according to claim 1, wherein the apparatus further includes: a threshold setting unit configured to set the predetermined thresholds according to the phase noise.

3. The apparatus according to claim 2, wherein the threshold setting unit includes:

a calculating subunit configured to, according to a rotation angle of a constellation induced by the phase noise and maximum predetermined distances that constellation points are permitted to move in the constellation to which the subcarriers correspond, calculate a farthest distance from the constellation points in the constellation to a center constellation point; and a setting subunit configured to set the modulation formats according to a correspondence relationship between the farthest distance and a modulation format and the farthest distance, and use corresponding bit numbers to which the set modulation formats correspond as the predetermined thresholds.

4. The apparatus according to claim 1, wherein the apparatus further includes: a power adjusting unit configured to adjust the power allocated by the power allocating unit for the subcarriers according to the phase noise.

5. The apparatus according to claim 4, wherein, a ratio of power after adjustment and power before adjustment is:

$$\frac{r_1}{r_1 - \frac{\sqrt{2}}{2} R \sin\theta};$$

where, $\theta$ denotes the rotation angle of the constellation of the subcarriers induced by the phase noise;

R denotes the farthest distance from the constellation points in the constellation to which the subcarriers correspond to the center; and $r_1$ denotes a distribution radius of signals around the constellation points in the constellation before adjustment.

6. Electronic equipment, including the apparatus for bit number allocation and power allocation of subcarriers according to claim 1.

7. A method for bit number allocation and power allocation of subcarriers, comprising:

calculating carrier bit numbers to which subcarriers in a multicarrier communications system correspond according to signal to noise ratios of the subcarriers;

allocating carrier bit numbers for the subcarriers based on calculated bit numbers to which the subcarriers correspond and a phase noise of the multicarrier communications system in communicating, where allocated bit numbers are related to signal modulation formats of the subcarriers; and allocating corresponding power for the subcarriers according to the allocated bit numbers allocated for the subcarriers, including quantizing the calculated bit numbers of the subcarriers to obtain integer bit numbers; and adjusting the integer bit numbers according to a result of comparison of the integer bit numbers with predetermined thresholds set based on a phase noise, and using the adjusted bit numbers as the allocated bit numbers.

8. The method according to claim 7, wherein the method further includes: setting the predetermined thresholds according to the phase noise.

9. The method according to claim 8, wherein the setting the predetermined thresholds includes:

according to a rotation angle of a constellation induced by the phase noise and maximum predetermined distances that constellation points are permitted to move in the constellation to which the subcarriers correspond, calculating a farthest distance from the constellation points in the constellation to a center constellation point; and setting the modulation formats according to a correspondence relationship between a farthest distance and a modulation format and the farthest distance, and using corresponding bit numbers to which the set modulation formats correspond as the predetermined thresholds.

10. The method according to claim 7, wherein the method further includes: adjusting the power allocated for the subcarriers according to the phase noise.

11. The method according to claim 10, wherein, a ratio of power after adjustment and power before adjustment is:

$$\frac{r_1}{r_1 - \frac{\sqrt{2}}{2} R \sin\theta};$$

where, $\theta$ denotes the rotation angle of the constellation of the subcarriers induced by the phase noise;

R denotes the farthest distance from the constellation points in the constellation to which the subcarriers correspond to the center; and $r_1$ denotes a distribution radius of signals around the constellation points in the constellation before adjustment.

12. A non-transitory computer readable storage medium according to claim 7 for controlling a computer.

* * * * *